(12) United States Patent
Manuel

(10) Patent No.: US 6,357,123 B1
(45) Date of Patent: Mar. 19, 2002

(54) JIGSAW APPARATUS

(76) Inventor: John Manuel, 404 Crestlawn Dr., Lafayette, LA (US) 70503

( * ) Notice: Subject to any disclaimer, the term of this patent is extended or adjusted under 35 U.S.C. 154(b) by 0 days.

(21) Appl. No.: 09/655,903

(22) Filed: Sep. 6, 2000

(51) Int. Cl.$^7$ .................. B23D 49/04; B23D 49/10
(52) U.S. Cl. .................. 30/374; 30/392; 83/782
(58) Field of Search .............. 30/392–394, 374; 83/782, 783

(56) References Cited

U.S. PATENT DOCUMENTS

| | | | | |
|---|---|---|---|---|
| 93,138 A | * | 7/1869 | Thompson et al. ............ | 83/783 |
| 102,263 A | * | 4/1870 | Highley ........................ | 83/783 |
| 2,206,614 A | | 7/1940 | O'Hern ......................... | 29/73 |
| 4,213,242 A | | 7/1980 | Partington ................... | 30/374 |
| 4,841,823 A | * | 6/1989 | Brundage ................. | 83/783 X |
| 4,949,464 A | | 8/1990 | Adomatis ................... | 30/509 |
| 5,027,518 A | | 7/1991 | Adomatis ................... | 30/392 |
| 5,138,769 A | | 8/1992 | Takahashi et al. ........... | 30/392 |
| 5,197,369 A | * | 3/1993 | Steiner ....................... | 83/782 |
| 5,303,478 A | | 4/1994 | Gugel ......................... | 30/392 |
| 5,313,709 A | | 5/1994 | Pabon-Delgado ........... | 30/513 |
| 5,561,909 A | | 10/1996 | Berg et al. ................... | 30/392 |
| 5,896,799 A | * | 4/1999 | Chen ....................... | 83/783 X |

* cited by examiner

*Primary Examiner*—Douglas D. Watts
(74) *Attorney, Agent, or Firm*—Garvey, Smith, Nehrbass & Doody, LLC

(57) ABSTRACT

A jigsaw apparatus includes a motor housing having a motor drive, a blade reciprocally powered by the motor drive, and a blade support arrangement that includes an arm that extends to the rear (or side) of the motor housing, the arm having a free end that supports a guide block. A base positioned at the lower end of the motor housing has sockets or like receptacles that receive the arm at selected orientations. The blade is specially configured, having an opening at its lower end for receiving a fastener and a slider block. The slider block travels in a vertical bore of the guide block.

19 Claims, 5 Drawing Sheets

JIGSAW APPARATUS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to powered cutting devices, particularly jigsaws. More particularly, the present invention relates to an improved jigsaw apparatus that features a special blade and blade support arrangement having an arm that extends selectively to a side of the base portion of the saw housing or to the rear thereof, and wherein the arm supports a guide block that receives a slider attached to the lower end portion of the blade.

2. General Background of the Invention

Powered saw arrangements have taken many forms. One of the most common forms is a "jig" saw which has a forwardly facing blade that is vertically oriented with respect to the piece of wood being cut. Typically, the blade is mounted at the forward end portion of a motor housing that can have a handle for the user and an on/off switch or trigger for operating the motor contained within the housing.

Several patents have been issued which relate to cutting saws. A number of patents have issued that are directed to various saw configurations. An example is the O'Hern U.S. Pat. No. 2,206,614 entitled "Power Hack Saw". The motor operated saw of the O'Hern patent includes a frame, a gear housing at one end of the frame, the gear housing having an open end, a motor support including a handle, adapted to extend into the open end of the gear housing, means for connecting the motor support within the gear housing, a motor and the motor support, the motor including a shaft, a pinion on the forward end of the shaft, a vertical shaft within the gear housing, a pinion on the vertical shaft rotating in a horizontal plane, the pinion on the motor shaft adapted to mesh with the pinion on the vertical shaft when the motor support is positioned adjacent to the gear housing, a reciprocating saw blade carrying rod mounted within the gear housing, and means for transmitting movement of the vertical shaft to the reciprocating rod, operating the rod and saw blade carried thereby.

U.S. Pat. No. 4,949,464 discloses a cordless, electric hand saw. A u-shaped frame is removably mounted to the saw mainframe to support the outer end of a coping saw blade having an inner end removably mounted to a reciprocably driven linkage connected to a battery operated motor contained in the handle. A keyhole saw blade is mountable to the reciprocably driven cylinder once the coping saw blade is removed.

U.S. Pat. No. 4,213,242 discloses an attachment for use with a saber saw which enables the saber saw to make straight non-wandering cuts. The attachment includes a plate which is secured flat wise to the base of the saber saw and a supporting fin extends downwardly from the plate and is located behind the reciprocating blade of the saber saw. The lower portion of the fin has a pair of spaced guides which define a slot to receive the blade. The fin and guide members maintain the blade in perpendicular relation to the base plate and prevent deformation of the blade as a cut is made.

U.S. Pat. No. 5,027,518 discloses a cordless, electric hand saw with a U-shaped frame that is removably mounted to the saw mainframe to support the outer end of a coping saw blade having an inner end removably mounted to a reciprocably driven linkage connected to a battery operated motor contained in the handle. A keyhole saw blade is mountable to the reciprocably driven cylinder once the coping saw blade is removed.

U.S. Pat. No. 5,138,769 discloses a scroll saw having a blade that includes a body, a piston connected to the blade to be moved upwardly and downwardly, and a motor for driving the piston upwardly and downwardly. A member is removably secured to the sawing blade. A pulled down member is removably secured to the other end of the blade. A pulling down member is engaged with the pulled down member, and a suspension unit including a spring is attached to the arm and adapted to tension the blade by the elastic restoring force of the spring as the piston moves. The scroll saw machine is appropriately used as a fixed installation type or a hand-held type saw.

U.S. Pat. No. 5,303,478 discloses an encased electrically powered motor housing unit with a first handle parallel inline to the height of the unit. Extending out from the top of the handle is a metal bar one inch in diameter which runs out forward from the motor housing unit to which is attached a second handle bar parallel inline to the first handle and the motor housing. Extending out from the bottom of this second handle is a metal rod with a spring and bolt parallel in line to the metal bar. This metal rod has a hole in it for mounting one end of a metal hack saw blade. The other end of the blade is to be mounted to a metal piece extending out from the bottom of the motor housing which when running, moves back and forth, causing a sawing motion. Directly above the metal rod with a spring and directly above the metal piece is a metal bar to which is attached a roller to keep the hack saw blade steady.

U.S. Pat. No. 5,561,909 discloses an electrically operated reciprocating tool that includes a housing with a counterbalance, single throw crankshaft mounted for rotation within the housing. The crankshaft rotates on a central shaft, and includes a weighted counterbalance section extending radially on an opposite side of the shaft and is pivotally connected to one end of an elongate drive length. The opposite end of the drive length is pivotally connected to a reciprocable unit mounted for movement in a raceway formed in the housing. A battery powered drive unit mounted in the housing is connected to rotate the crankshaft.

BRIEF SUMMARY OF THE INVENTION

The present invention provides an improved jigsaw apparatus that includes a motor housing that has a handle enabling a user to manipulate the housing. The housing also provides a blade aperture that enables connection of a blade to the housing. An on/off switch is provided, preferably on the housing.

A base is supported by the housing, below the housing, and next to the undersurface of the housing. The base has a flat outer surface defining a base plane that engages a work piece during use.

A powered blade is reciprocally mounted to the motor housing via the blade aperture, at a position generally perpendicular to the base plane. The blade has a forward facing toothed cutting edge, and upper and lower end portions.

An arm extends from the combination of the motor housing and the base plate. The arm is generally C-shaped, having an upper section, a rear section, and a lower section that is spaced below and preferably generally parallel to the upper section and the base plate.

A guide block is supported by the arm generally opposite the blade aperture. The guide block has a vertical bore.

A slider block is attached to the lower end of the blade (eg. bolted or other suitable attachment) and slidably disposed during use within the slider block bore.

In one embodiment, the arm is removably attachable to the base at a number of different positions that change the configuration of the arm with respect to the base. For example, in the preferred embodiment there are multiple receptacles on the base that accept the arm for attachment thereto. These receptacles can include one or more receptacles on the side or sides of the base, and a rear receptacle that extends from the rear of the base. This configuration enables the arm to be positioned as selected by a user depending upon the product to be cut.

The present invention can be in the form of an attachment for a portable jigsaw which will provide for a greater depth of cut. The present invention will provide a more accurate cut by utilizing a longer blade than is commonly available for a jigsaw. Additionally, by supporting this longer blade at its lower end the blade ensures that the cut will be perpendicular to the stock for the full length of the cut.

The components of the apparatus that can be fitted to a commercially available jigsaw are the base, the arm, the slider guide block, and the slider block.

The base can consist of a solid metal rectangular block with a length and width equal to that of the base of the jigsaw on which it is to be mounted and about one-half inch (½") to five-eights inch (⅝") thick.

This block can have holes through which it will be attached to the saw (eg by screws), an opening at the center of the blade end extending just beyond the back of the blade. A rectangular hole about three-eights inch (⅜") high and one-half inch (½") wide is provided extending horizontally through the base from one side to the other. A similar hole extends horizontally from the back of the base to the front of the base. These rectangular holes will allow the support arm to be mounted to the base by its intersection into the base from either side or the back. These holes are preferably positioned in the base block so as to provide proper aligning of the upper and lower ends of the blade. There should also be a hole in the base block to allow access to the base tilting screw behind the blade, positioned at the center of the body of the saw. Holes are provided for aligning and securing the arm which is inserted into the base.

The arm of the device will be preferably a "C" shape, with its upper end framed to fit into the base block and its lower end formed to hold the slider guide block in the proper place, and to support the lower end of the blade. The main part of the arm will be preferably square in section, hollow metal stock adequate to withstand the stress and vibration of the saw in operation.

The end which will be inserted into the base can be of solid metal, welded to the main body of the arm and of a size and shape so that it fits snugly into the rectangular holes in the base, being secured there by screws. From the portion inserted into the saw, the upper arm will extend horizontally away from the body of the saw a sufficient length to allow the cross-cutting of a twelve inch (12") board, turn ninety degrees (90°) downward a distance to accommodate the desired blade length (blades of eg. two, four and six inch cutting lengths with correspondingly sized arms are preferred). The arm turns ninety degrees (90°) back toward the body of the saw a distance appropriate to hold the slider guide block in proper alignment with the blade and be formed at this lower end so as to allow the attachment of the slider guide block in a manner which will insure rigidity and constancy in maintaining proper blade alignment.

The slider guide block, which will be attached to the lower section of the arm, is held perpendicular to the arm. It will preferably be of metal with a square vertical hole about one-half inch (½") per side running its full length through which the slider will move freely but within such tolerances so as to prevent any wobble or "slap".

The slider will be approximately one-half inch (½") square and of sufficient length to be pushed down and pulled up by the attached blade while staying fully within the confines of the guide block. The upper or blade end of the slider will be "shouldered", that is, cut downward through its center about one-half inch (½") with a horizontal cut from one side to meet the vertical cut at ninety degrees (90°), resulting in a notch which will be the mounting point for the lower end of the blade. The part of the slider against which the lower side of the blade shall rest will be bored horizontally through its center and threaded to accept a blade attachment screw.

The blades can be of varying lengths, widths, thicknesses, and have desired tooth configurations so as to be most efficient in cutting a variety of materials such as wood, metal, plastics, etc. The upper end will be of the "tang" configuration so as to fit most popular and commercially available heavy duty jigsaws (eg. Bosch, Dewalt, Makita). The lower end will be square with a hole vertically through at a point which, when held in place by a screw, will allow the bottom of the blade to rest against the bottom and side of the shoulder in the top end of the slider. The dimensions discussed above are exemplary, not intended to limit the scope of the invention.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
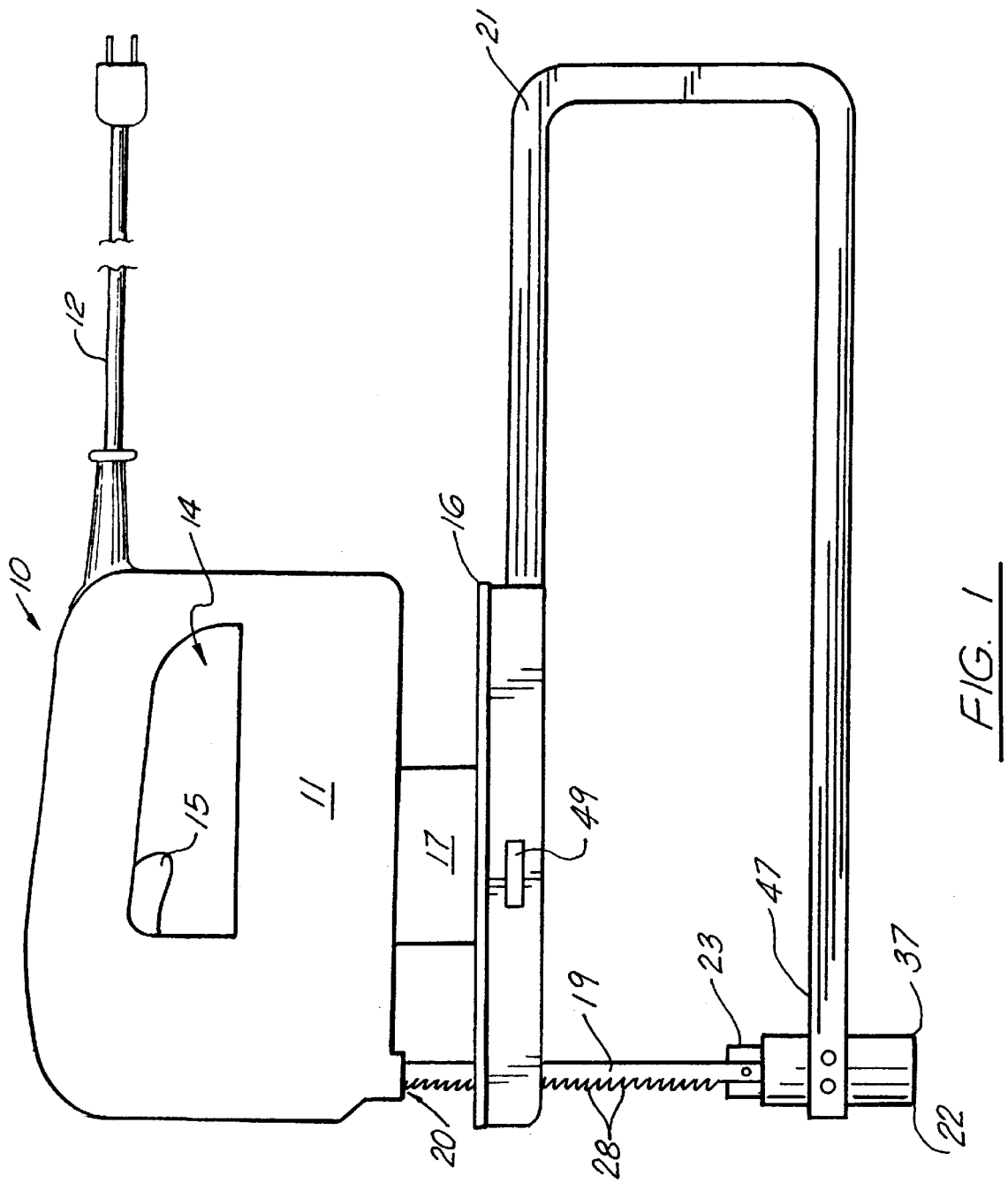
FIG. 1 is a side elevation view of the preferred embodiment of the apparatus of the present invention.
Figure 2:
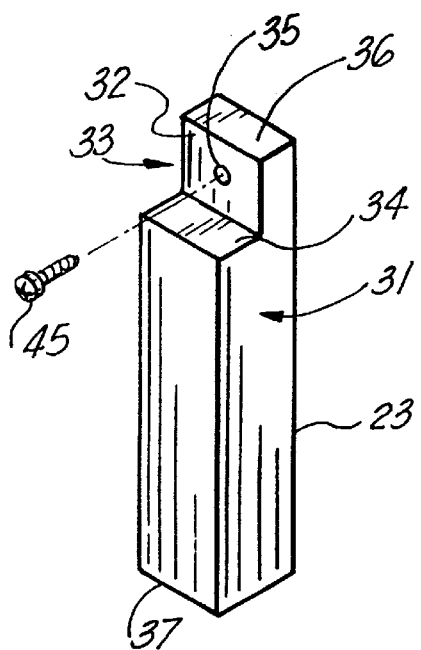
FIG. 2 is a partial perspective view of the preferred embodiment of the apparatus of the present invention showing the slider block.
Figure 10:
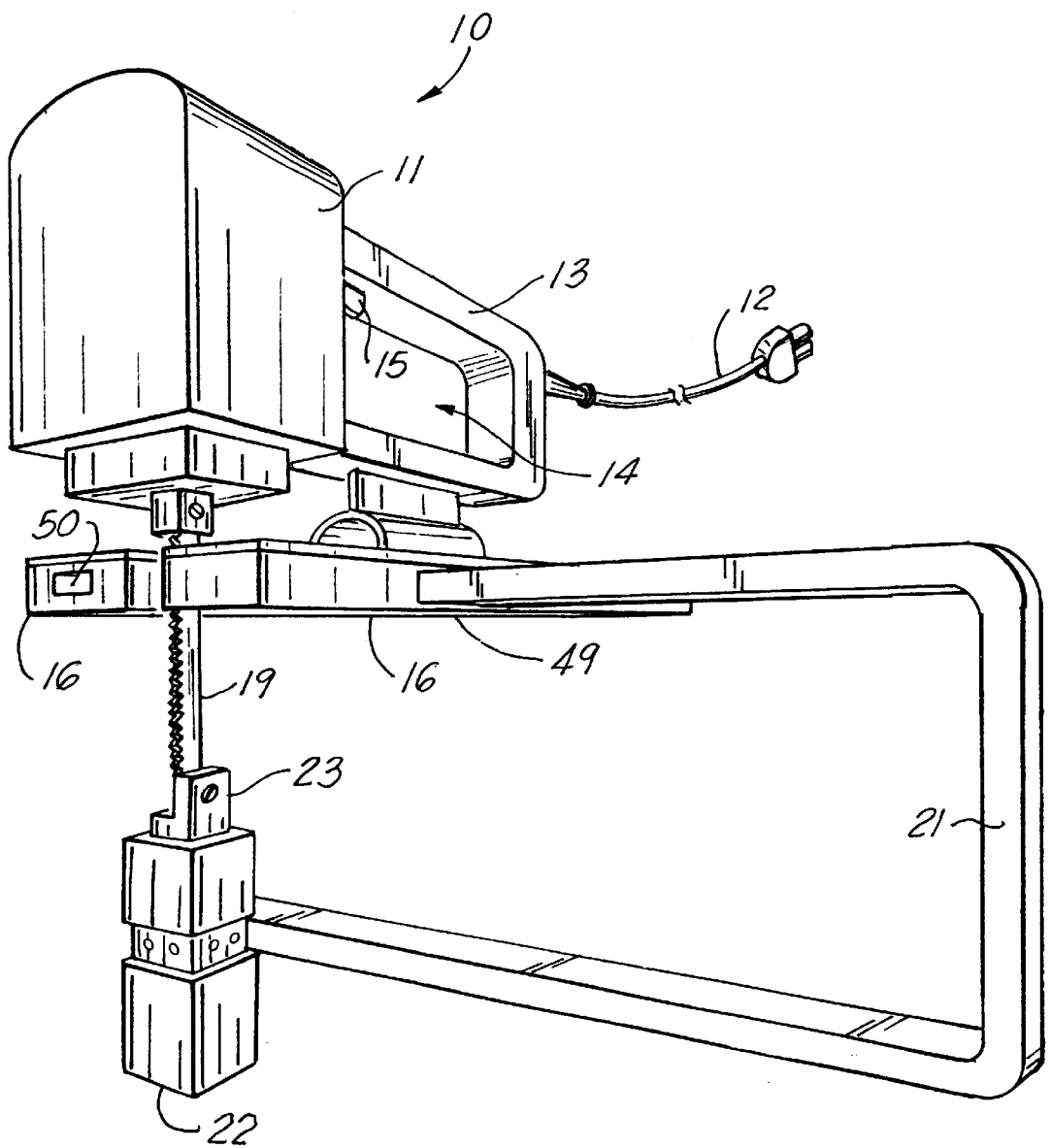
FIG. 10 is a perspective view of the preferred embodiment of the apparatus of the present invention.

FIGS. 1 and 10 show the preferred embodiment of the apparatus of the present invention designated generally by the numeral 10. Saw apparatus 10 includes a motor housing 11 that can be metallic or plastic, for example. The housing provides an interior that holds a motor for reciprocally driving saw blade 19. The motor and its linkage that reciprocally drive saw blade 19 is a mechanism (not shown) that is known in the art.

Housing 11 provides a power cord 12, handle 13 and trigger 15 positioned at opening 14. An on/off switch can be provided that is in the form of trigger 15 or simply a toggle switch mounted on housing 11.

Base 16 is shown in FIGS. 1 and 6–9. Base 16 is connected with mounting member 17 to the underside 18 of motor housing 11. The mounting member (or a plurality of different mounting members) can be provided and configured to form an interface between base 16 and the housing 11 of any selected commercially available jig saw. Motor housing 11 has an aperture 20 that is a blade aperture for receiving and attaching a blade 19 at its upper end portion 26. The upper end 26 will be of a selected "tang" configuration so as to fit most popular and commercially available heavy duty jigsaws (eg. Bosch, Dewalt, Makita).

Arm 21 removably attaches to a selected position of base 16 as selected by a user. The arm 21 can be attached to either side of base 16 at transverse channel 49 (see FIG. 10), or to the rear thereof. In FIG. 1, arm 21 is shown attached to the rear of base 16 at longitudinal channel 50 (see FIG. 1). Arm 21 has a stop 51 to position it properly when inserted into a channel 49 or 50 by limiting the penetration of arm 21 thereinto.

Arm 21 supports guide block 22. Guide block 22 slidably receives slider block 23 which can be attached to the lower end portion 25 of blade body 24. The upper end portion 26 of blade body 24 forms an attachment to linkage contained within motor housing 11 at the blade aperture. The specifics of the attachment of blade 19 end 26 to motor housing 11 are not shown because such connections are known in the art. Lower end portion 25 of blade 19 has an opening 30 that aligns with and forms an attachment to opening 35 of slider block 23. Blade 19 has leading edge 27 having a plurality of teeth 28, and trailing edge 29.

Slider block 23 has an outer surface 31 that includes a vertical surface 32 and horizontal surface 34 that intersect at recess 33. Slider block 23 has an upper end portion 36 that attaches to blade 19 and a lower portion 37 that is received within bore 38 of guide block 22. Internally threaded opening 35 of slider block 23 receives any suitable connector or fastener such as machine screw 45. Machine screw 45 first passes through opening 30 of blade 19 and then threadably engages and connects to opening 35 of slider block 23, forming a connection between slider block 23 and blade 19 as shown in FIG. 1.

Guide block 22 has an outer wall 44 surrounding a vertical bore 38. Wall 44 has an outer surface 39 and an inner surface 46. Recess 40 on the outer surface 39 of guide block 22 between shoulders 42, 43 is a recess that receives free end portion 47 of arm 21 (see FIGS. 1 and 10). Guide block 23 provides a plurality of internally threaded openings 41 that align with the openings 48 on arm 21.

Figure 3:
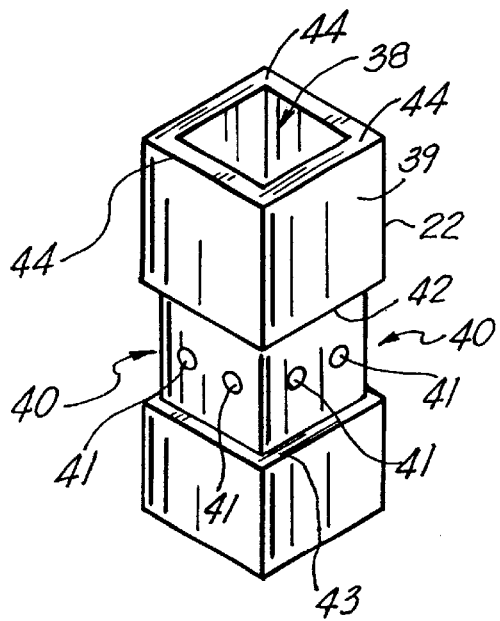
FIG. 3 is a partial perspective view of the preferred embodiment of the apparatus of the present invention showing the guide block.
Figure 4:
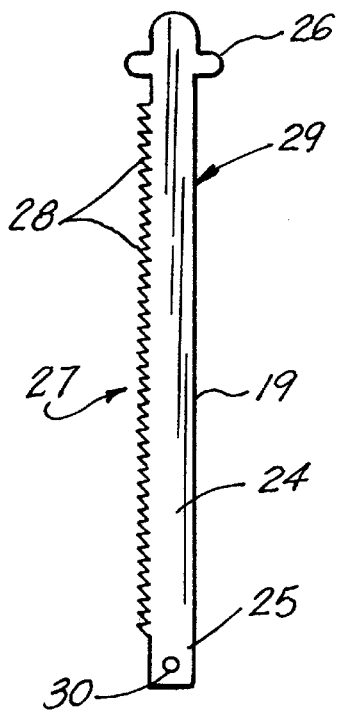
FIG. 4 is a elevation view of the blade portion of the preferred embodiment of the apparatus of the present invention.
Figure 6:
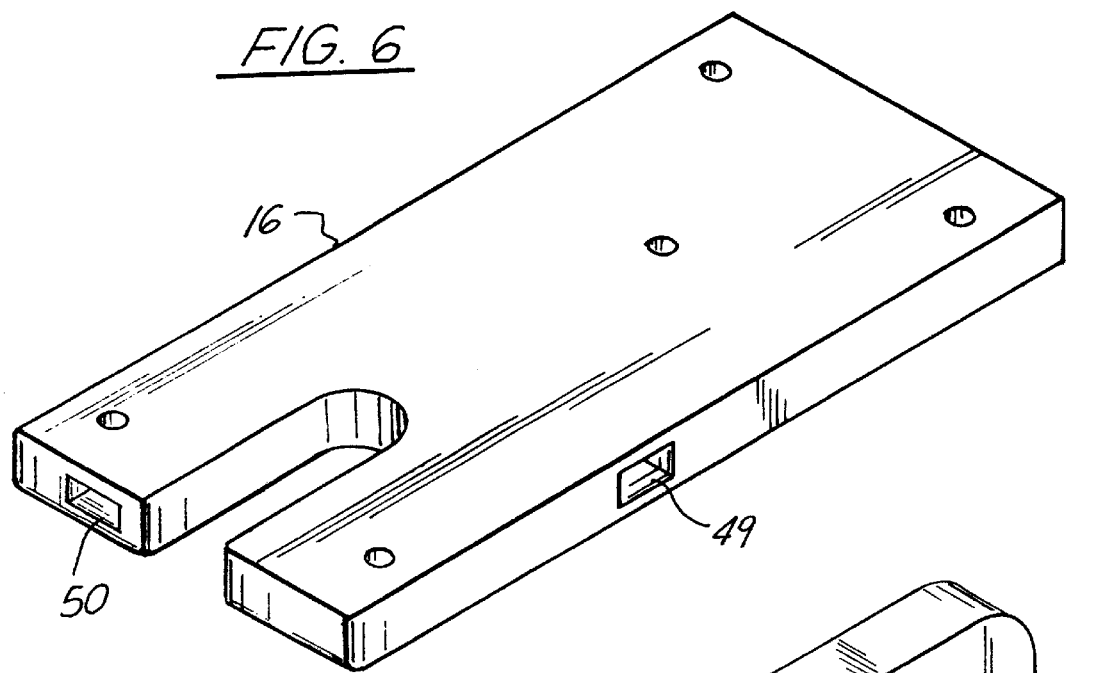
FIG. 6 is a perspective view of the preferred embodiment of the apparatus of the present invention illustrating the base plate portion thereof.
Figure 5:
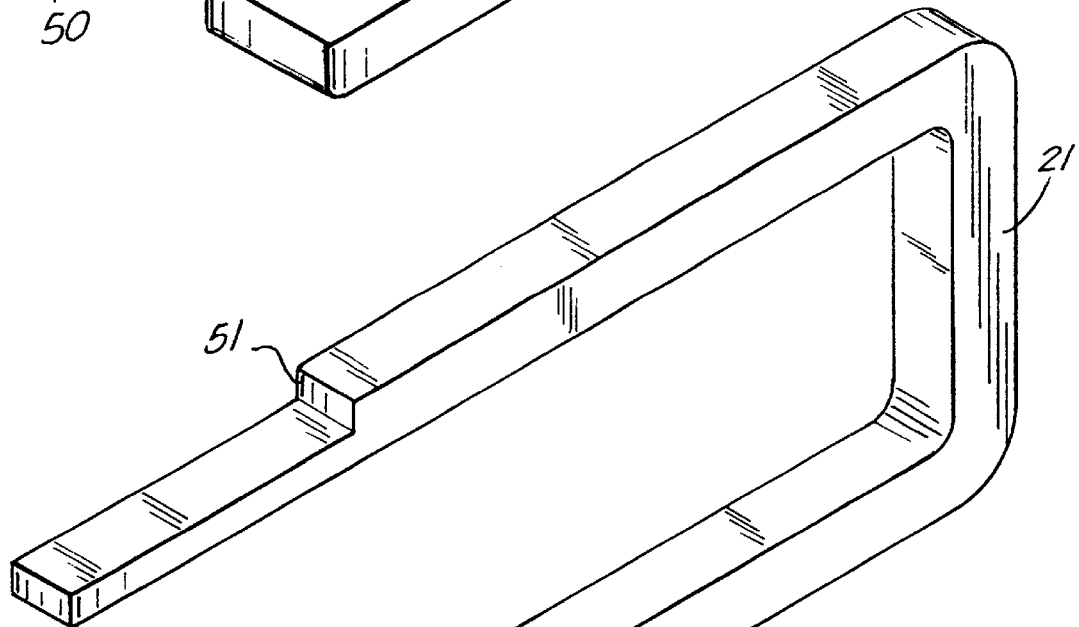
FIG. 5 is a partial, perspective view of the preferred embodiment of the apparatus of the present invention illustrating the arm portion thereof.
Figure 8:
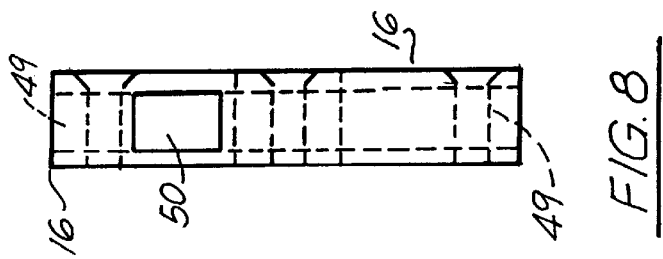
FIG. 8 is an end view of the base plate of FIG. 7.
Figure 7:
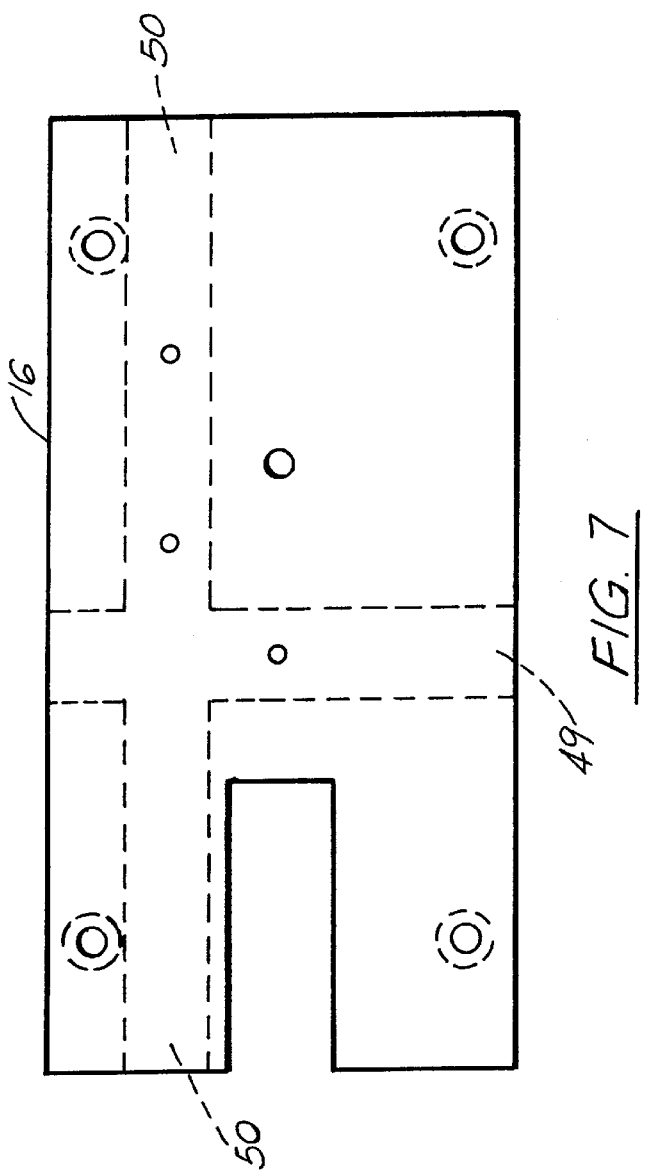
FIG. 7 is a plan view of the base plate portion of the preferred embodiment of the apparatus of the present invention.
Figure 9:
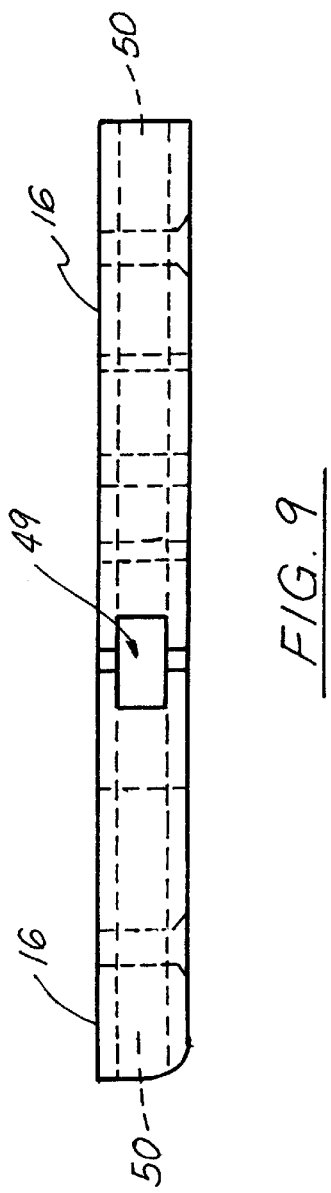
FIG. 9 is a side view of the base plate of FIG. 7.

Fasteners 49 such as machine screws) extend through the openings 48 of arm 21 and then into the internally threaded openings 41 of guide block 22. In the preferred embodiment, the recess 40 is provided on four sides of guide block 22, each of the sides providing a pair of internally threaded openings 41 as shown in FIG. 3. Arm 21 can thus attached to any side of guide block 22. Stop 51 limits the penetration of arm 21 into the selected channel 49 or 50.

The following is a list of parts and materials suitable for use in the present invention:

| Part No. | Description |
| --- | --- |
| 10 | saw apparatus |
| 11 | housing |
| 12 | power cord |
| 13 | handle |
| 14 | opening |
| 15 | trigger |
| 16 | base |
| 17 | mounting member |
| 18 | underside |
| 19 | saw blade |
| 20 | aperture |
| 21 | arm |
| 22 | guide block |
| 23 | slider block |
| 24 | blade body |
| 25 | lower end |
| 26 | upper end |
| 27 | leading edge |
| 28 | teeth |
| 29 | trailing edge |
| 30 | opening |
| 31 | outer surface |
| 32 | vertical surface |
| 33 | recess |
| 34 | horizontal surface |
| 35 | internally threaded opening |
| 36 | upper end |
| 37 | lower end |
| 38 | vertical bore |
| 39 | outer surface |
| 40 | recess |
| 41 | internally threaded opening |
| 42 | shoulder |
| 43 | shoulder |
| 44 | outer wall |
| 45 | fastener |
| 46 | inner surface |
| 47 | free end portion |
| 48 | opening |
| 49 | transverse channel |
| 50 | longitudinal channel |
| 51 | stop |

The foregoing embodiments are presented by way of example only; the scope of the present invention is to be limited only by the following claims.

What is claimed is:

1. a jigsaw apparatus comprising:
   a) a motor housing that has front and rear end portions, a handle enabling a user to manipulate the housing, a blade aperture, an on/off switch and an undersurface;
   b) a base that is supported below the housing next to undersurface, the base having a flat outer surface defining a base plane;
   c) a powered blade reciprocally mounted to the motor housing at the blade aperture, at a position generally perpendicular to the base plane, the blade having a forward facing toothed cutting edge;
   d) an arm that extends rearwardly from the combination of motor housing and base plate, the arm housing a lower section spaced below and generally opposite the base plate;

e) a guide block supported by the arm opposite the blade aperture, the guide block having a vertical bore;

f) a slider block attached to the lower end of the blade and slidably disposed during use within the slider block bore.

2. The jigsaw apparatus of claim 1 wherein the blade has a lower opening that enables attachment of the slide block to the bore with a fastener that extends through the blade opening.

3. The jigsaw apparatus of claim 1 wherein the blade has upper and lower end portions, the upper end portion defining a tang with at least one laterally extending portion.

4. The jigsaw apparatus of claim 3 wherein the blade has upper and lower end portions, the upper end portion defining a tang with at least a pair of laterally extending projections.

5. The jigsaw apparatus of claim 1 wherein the base has a plurality of receptacles, and the position of the arm can be changed relative to the motor housing by attaching the arm to a different selected receptacle.

6. The jigsaw apparatus of claim 1 wherein the arm can be attached to the base in different angular orientations relative to the motor housing.

7. The jigsaw apparatus of claim 1 wherein the base has a pair of approved sides, a front and a rear, and wherein the arm is attachable to the base at either side.

8. The jigsaw apparatus of claim 1 wherein the base has a pair of approved sides, a front and a rear, and wherein the arm is attachable at a selected side or at the rear thereof.

9. The jigsaw apparatus of claim 1 wherein the base has a pair of approved sides, a front and a rear, and wherein the arm is attachable at the rear or at either side.

10. a jigsaw apparatus comprising:
    a) a motor housing that has front and rear end portions, a handle enabling a user to manipulate the housing, a blade aperture, an on/off switch and an undersurface;
    b) a base that is supported below the housing next to the undersurface, the base having a top surface, a pair of opposed side surfaces, a front surface and a rear surface, at least a plurality of said side, front and rear surfaces having a receptacle that defines an attachment position;
    c) a powered blade reciprocally mounted to the motor housing at the blade aperture, at a position generally perpendicular to the base plane, the blade having a forward facing toothed cutting edge;
    d) an arm that is removably connectable to the base at one of the receptacles, the arm having a lower section that is spaced vertically below the base, the lower section being at least as long as the base and extending along a majority of the length of the base;
    e) a guide block supported by the arm opposite the blade aperture, the guide block having a vertical bore;
    f) a slider block attached to the lower end of the blade and slidably disposed during use within the slider block bore.

11. The jigsaw apparatus of claim 10 wherein the blade has a lower opening that enables attachment of the slide block to the bore with a fastener that extends through the blade opening.

12. The jigsaw apparatus of claim 10 wherein the blade has upper and lower end portions, the upper end portion defining a tang with at least one laterally extending portion.

13. The jigsaw apparatus of claim 10 wherein the blade has upper and lower end portions, the upper end portion defining a tang with at least a pair of laterally extending projections.

14. The jigsaw apparatus of claim 10 wherein the lower section is generally parallel to the base.

15. The jigsaw apparatus of claim 10 wherein the base has a bottom surface that defines a plane, and the arm has an upper section with a surface that is in said plane.

16. The jigsaw apparatus of claim 10 wherein the blade has a lower end portion with an opening and the blade removably attaches to the slider block at the blade opening.

17. The jigsaw apparatus of claim 10 wherein the blade is positioned at the front end portion of the base.

18. The jigsaw apparatus of claim 17 wherein the blade has opposed flat surfaces that are generally perpendicular to the base.

19. a jigsaw apparatus comprising:
    a) a motor housing that has front and rear end portions, a handle enabling a user to manipulate the housing, a blade aperture, an on/off switch and an undersurface;
    b) a base that is supported below the housing next to the undersurface, the base having a top surface, a pair of opposed side surfaces, a front surface and a rear surface, at least a plurality of said side, front and rear surfaces having a receptacle that defines an attachment position;
    c) a powered blade, reciprocally mounted to the motor housing, the blade having opposed flat side surfaces, a forward facing toothed edge, and a lower end with a first connection;
    d) an arm that is removably connectable to the base at one of the receptacles, the arm having a lower section that is spaced vertically below the base, the lower section being at least as long as the base and extending along a majority of the length of the base;
    e) a guide block supported by the arm opposite the blade aperture, the guide block having a vertical bore;
    f) a slide block attached to the lower end of the blade and slidably disposed during use within the slider block bore, the slider block having a second connector that removably attaches to the first connector.

* * * * *